United States Patent [19]

Saito

[11] Patent Number: 4,511,944

[45] Date of Patent: Apr. 16, 1985

[54] MAGNETIC DISK CARTRIDGE

[75] Inventor: Etsuro Saito, Ayase, Japan

[73] Assignee: Sony Corporation, Tokyo, Japan

[21] Appl. No.: 388,998

[22] Filed: Jun. 16, 1982

[30] Foreign Application Priority Data

Jun. 16, 1981 [JP] Japan .............................. 56-88562[U]

[51] Int. Cl.³ ...................... G11B 23/02; G11B 5/012; G11B 17/02; B65D 85/30
[52] U.S. Cl. ..................................... 360/133; 360/97; 360/86; 206/444
[58] Field of Search ................. 360/133, 135, 137, 97, 360/86, 98, 99; 346/137; 206/444, 1

[56] References Cited

U.S. PATENT DOCUMENTS

| | | | |
|---|---|---|---|
| 3,650,378 | 3/1972 | Kakiuchi | 206/1 |
| 4,320,430 | 3/1982 | Vogt | 360/133 |
| 4,358,801 | 11/1982 | Faber | 360/97 |
| 4,412,260 | 10/1983 | Stricklin | 360/132 |
| 4,419,703 | 12/1983 | Gruczelak | 360/133 |

Primary Examiner—Robert Martin Kilgore
Attorney, Agent, or Firm—Eslinger & Pelton

[57] ABSTRACT

A magnetic disc cartridge, having a jacket which contains a rotatable magnetic disc, is loaded into a cartridge holder of recording and/or reproducing apparatus for recording and/or reproducing signals on the rotatable magnetic disc. The cartridge has a guide groove longitudinally extending in a direction in which the cartridge is inserted into the holder for receiving a guide element provided in the holder. A shutter is movable across a window provided in the jacket between a closed position and an opened position, and includes a projection extending into the guide groove to be contacted by the guide element when the cartridge is inserted properly into the holder. The guide element thus moves the shutter is from the closed position to the open position thereof when the cartridge is inserted in the cartridge holder.

14 Claims, 9 Drawing Figures

MAGNETIC DISK CARTRIDGE

BACKGROUND OF THE INVENTION

This invention relates to a magnetic disk cartridge and, more particularly, to such a cartridge which is formed of a jacket in which a rotatable magnetic disk is housed.

Rotatable magnetic disks have been used for recording information in various types of devices. For example, in computer systems, word processors, and the like, magnetic disks, known as "diskettes", have been used to record information signals. Typically, such diskettes are housed in a jacket which serves to protect the magnetic information recording surfaces of the magnetic disk and, furthermore, to prevent the magnetic disk from being folded, crumpled or otherwise seriously damaged. Such a protective jacket is provided with a window through which one or more magnetic transducers may be inserted to magnetically contact the magnetic surface of the disk for recording or reproducing information signals thereon. Such information signals are recorded in a plurality of circular recording tracks.

In a magnetic disk of the aforementioned type, the jacket is provided with a shutter member which is rotatably or slidably moved across the window between the closed position and the opened position. However, in such jacket, the shutter member has had to be manually shifted when in use, or there will additional means have had to be provided for moving the shutter member from the closed position to the opened position.

OBJECTS AND SUMMARY OF THE INVENTION

Therefore, it is an object of the present invention to provide an improved magnetic disk cartridge having a shutter member which a is slidably moved across a window, through which magnetic head is inserted.

It is another object of the invention to provide an improved magnetic disk cartridge having a shutter member which is automatically moves so as to open the window when the cartridge is inserted into a cartridge holder.

Various other objects, advantages and features of the present invention will become readily apparent from the ensuring detailed description, and the invention will be particularly pointed out in the appended claims.

In one aspect of this invention a magnetic disc cartridge has a jacket and a rotatable magnetic disc housed within the jacket for recording signals thereon or reproducing signals therefrom when the cartridge, carried by a cartridge holder, is inserted into a recording or reproducing apparatus. The cartridge cpmprises a guide groove, which extends in a direction in which the cartridge is inserted into the cartridge holder, for receiving a guide element on the cartridge holder to establish a predetermined orientation of the cartridge relative to the cartridge holder. A window is provided in the jacket for providing access to the disc to record signals thereon or reproduce signals therefrom. The cartridge also comprises shutter means movable relative to the window between a closed position covering the window and an open position exposing the disc and a projection on the shutter means extending into the guide groove for contact by the guide element when the cartridge is inserted into the cartridge holder to move the shutter means from its closed position to its open position.

BRIEF DESCRIPTION OF THE DRAWINGS

The following detailed description, even by way of example, will be best understood in conjunction with the accompanying drawings in which.

DETAILED DESCRIPTION OF A PREFERRED EMBODIMENT

Figure 1:
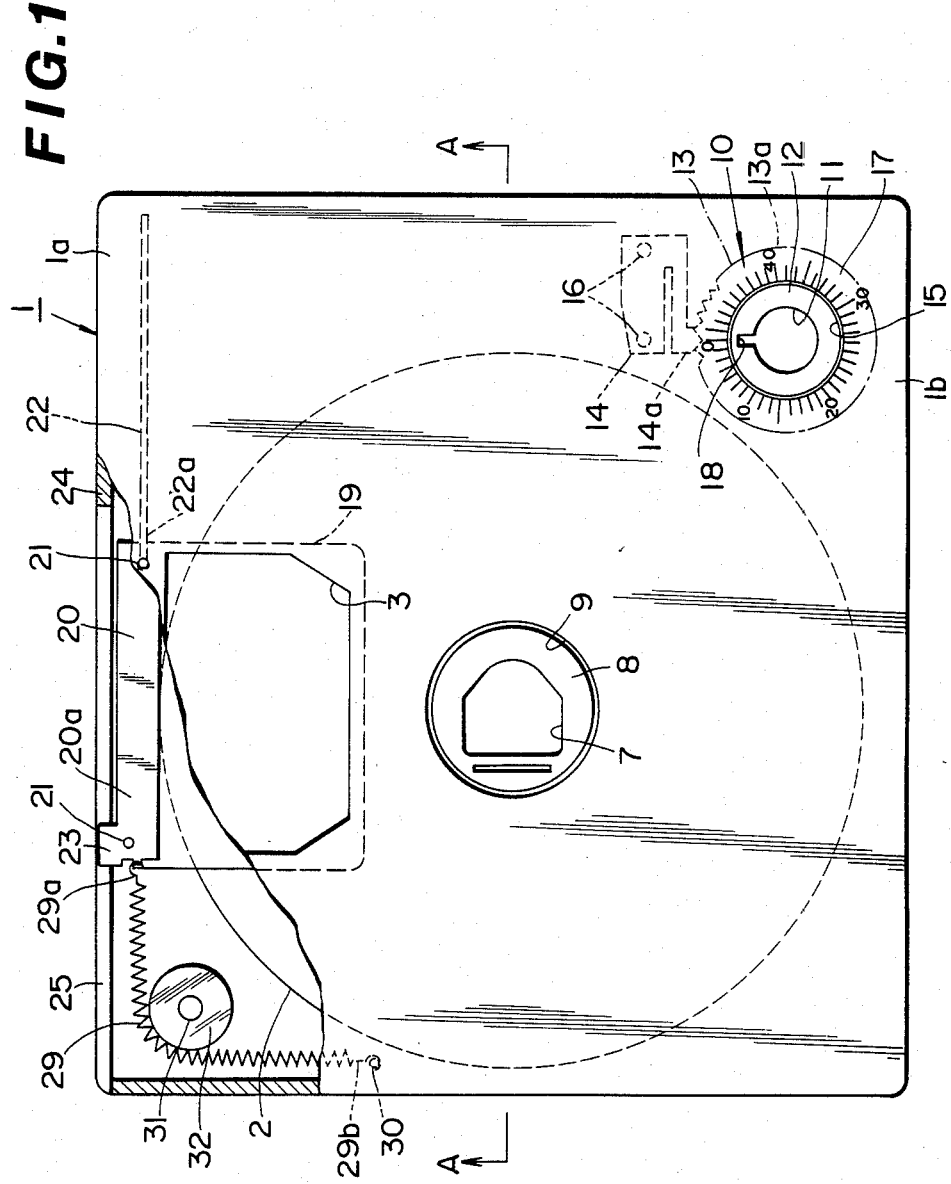
FIG. 1 is a plan view of the cartridge containing a flexible magnetic disk, shown partly broken away.
Figure 2:
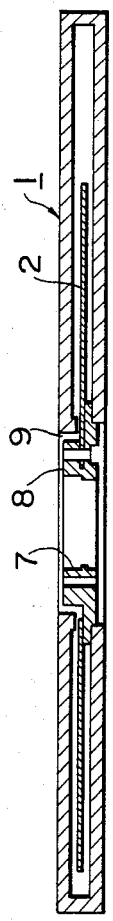
FIG. 2 is sectional view taken along the line A—A in FIG. 1.

Referring now to the drawings, wherein like reference numerals are used throughout, it will be seen that a cartridge intended for use in a flexible disk recording and/or reproducing apparatus comprises a substantially flat rectangular jacket or housing 1 which may be molded of a suitable plastic and in which a flexible disk or sheet 2 of magnetic material is freely rotatable. The jacket 1 comprises substantially parallel first and second walls and a peripheral wall circumscribing the jacket. Disk 2 is of a suitably small diameter, for example, no more than about 50 mm, so that jacket 1 can be of correspondingly small size, for example, measuring 60 mm by 54 mm by 3 mm, for convenience of handling, storage and shipping, as by mail, and for use in a very compact recording and/or reproducing apparatus which may, for example, be part of a still picture camera which is not substantially larger than a conventional 35 mm single-lens reflex camera. A window 3 is formed in a portion of the jacket so that the magnetic disc or sheet 2 is partially exposed to the outside. The window 3 is adapted for insertion of one or more magnetic heads 4 which function to magnetically record video signals representing still pictures so as to form concentrically a plurality of circular tracks on the magnetic disc or sheet 2.

At the center of rotation, the magnetic sheet 2 is equipped with a disk-shaped reinforcing member 8 which has a drive hole 7 to permit insertion of a rotary drive spindle 6 provided in a mangetic recorder 5 and is rotatable around an opening 9 formed in the jacket body 1.

An indicator means 10 for indicating the number of annular tracks in which the information signals have been recorded magnetically on the sheet 2 is provided on the jacket 1. As illustrated in FIG. 1, the indicator means 10 comprises a disk-shaped dial member 12 with a keyhole-like indication bore 11, a rotary gear 13 united with the dial member 12, and a stopper member 14 having an engaging portion 14a which is elastically engageable with a sawtooth region 13a of the rotary gear 13. The dial member 12 is housed in the jacket 1 and is allowed to be freely rotatable at the position of an opening 15 formed in the jacket 1. The stopper member 14 is anchored firmly with set-screws 16 in the jacket 1 and serves to rotate the gear 13 intermittently.

Around the opening 15 of the jacket 1, there is provided a scale 17 to indicate the numbers corresponding to the annular tracks in which the information signals have been recorded magnetically on the disc 2. In this embodiment, the scale 17 has a maximum graduation of 50. And a notch 18 formed in the indication bore 11 serves as an index to point at each graduation of the scale 17. The jacket 1 is further provided with a shutter member 19 which straddles the disc 2 and which is sufficient large to cover the window 3. The provision of such shutter or lid member 19 is effective in preventing entrance of dust and so forth into the jacket 1 through the window 3. In this embodiment illustrated, the lid member 19 is formed so as to cover both sides of the magnetic disc or sheet 2.

A slide plate 20 is attached to a lateral edge portion of the lid member 19 integrally therewith. And a plurality of pins 21 are provided on the upper and lower surfaces of the slide plate 20 in such a manner as to be displaceable along guide channels 22 formed in the first and second walls of the jacket 1. Accordingly, the slide plate 20 is rendered slidable in leftward and rightward direction of FIG. 1 to cover the window 3 and expose the disc 2, respectively.

A projection or protrusion 23 is formed at one end 20a of the slide plate 20 and is inserted into a guide groove 25 extending along one side of the peripheral wall 24 of the jacket 1.

Figure 3:
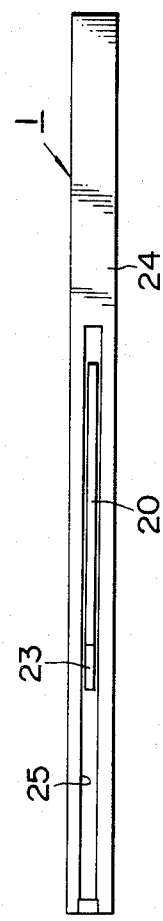
FIGS. 3 and 4 are side views of the cartridge of FIG. 1.
Figure 4:
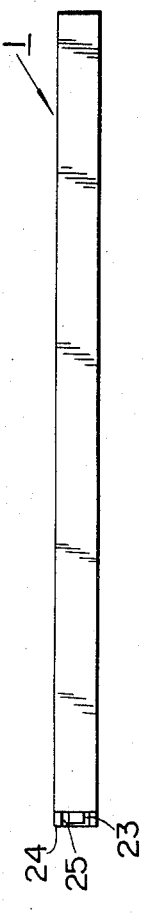

Therefore, the protrusion 23 comes to be exposed to the outside through the guide groove. The guide groove 25 begins at the end of one longitudinal section of the peripheral wall 24 and extends less than the length of that section. [Refer to FIGS. 3 and 4.] This protrusion 23 is engageable with a boss or guide element 28 formed in a cartridge holder 26 in which the jacket 1 is to be loaded. [Refer to FIGS. 6 (A) and (B).]

One end 29a of tension spring or elastic member 29 having resilient properties is connected to the projection 23 of the slide plate 20, while the other end 29b of the spring member 29 is anchored at a pin 30 fixed in the jacket 1. And in the vicinity of the middle portion of the spring member 29, a rotary pulley 32 is mounted rotatably on a stationary shaft 31 so as to attain enhanced expansion and contraction of the spring member 29. The slide plate 20 is always urged leftward in FIG. 1 by the elasticity of the member 29. Consequently, the lid 19 is biased closed. The slide plate 20 is positioned by, for example, the pin 21 of the slide plate 20 at one end 22a of the channel 22 and is thereby stopped at the position illustrated in FIG. 1 so as to be prohibited from being further shifted in a leftward direction.

The cartridge holder 26 for loading the jacket 1 therein consists of, in this embodiment, a pair of support regions or guide rails 33 and 34 having L-shaped cross sections to receive the two opposite longitudinal sections or side portions 1a and 1b of the peripheral walls of the jacket 1, and a joint plate 35 and a top plate 36 to couple the support regions 33 and 34 to each other at the two ends thereof. One support region 33 has a boss or guide element 28 engageable with the aforementioned projection 23 formed on the lid member 19 of the jacket 1. The upper and lower portions of the cartridge holder 26 are equipped respectively with a case cover 38 supported swingable by a hinge shaft 37 in an openable/closable manner and a base plate 39 supported by the same shaft 37. The base plate 39 mounts thereon a drive spindle 6 inserted in a drive hole 7 formed in the jacket 1, a flywheel 40 attached to the drive spindle 6, a belt 42 for connecting the flywheel 40 with a pulley 41, a drive motor 43 for rotating the pulley 41, a swing lever 44 to which a magnetic head 4 is attached, a lower guide plate 45 for guiding the magnetic sheet 2, and a sensor mechanism 46 for detecting the number of tracks recorded on the magnetic sheet 2. Furthermore, an upper guide plate 47 is attached to the inner surface of the case cover 38 at the position corresponding to the lower guide plate 45.

The magnetic sheet cartridge of the present invention having the above-described structure functions as follows.

Figure 5:
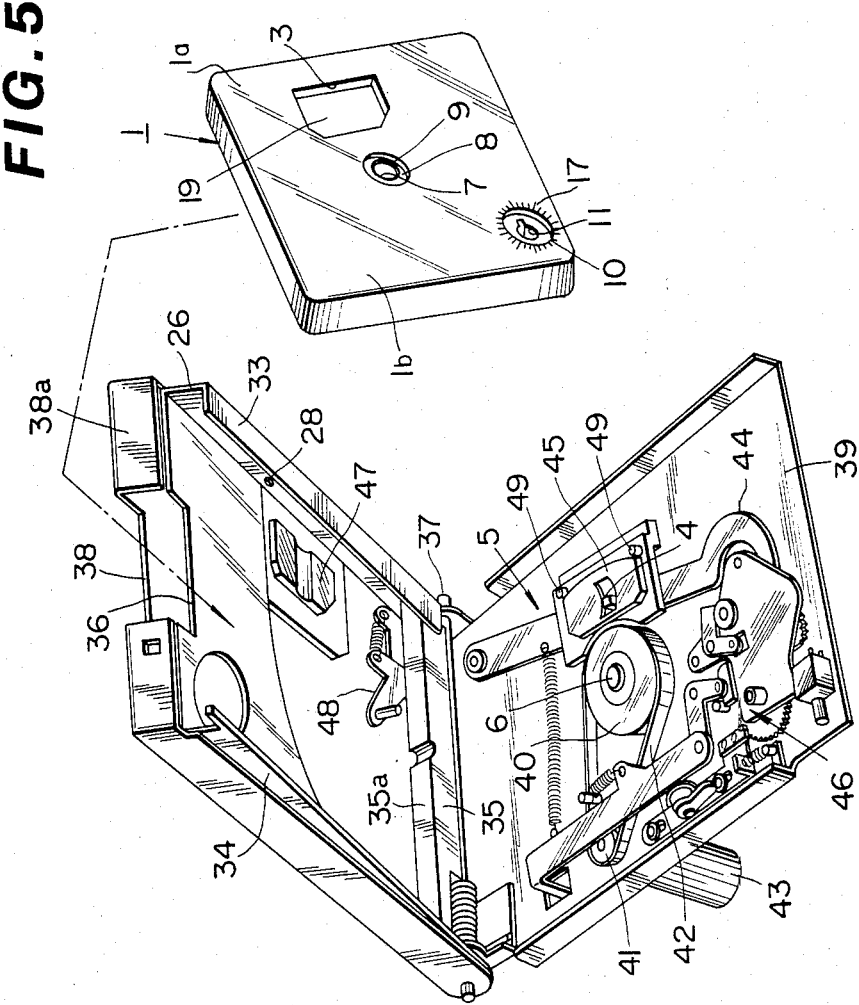
FIG. 5 is a perspective view of magnetic disc cartridge holder, used with a recording and/or reproducing apparatus, illustrating how the cartridge of FIG. 1 interfits therewith.
Figure 6A:
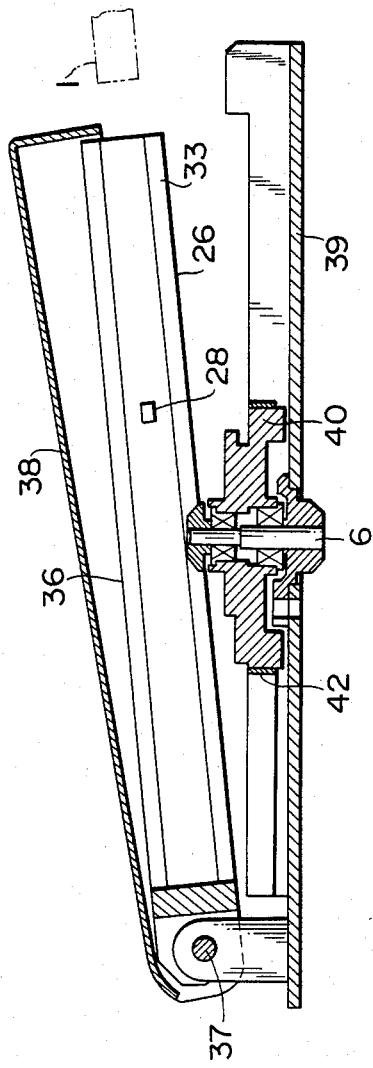
FIGS. 6(A) and (B) are sectional front views of the cartridge holder of FIG. 5.
Figure 6B:
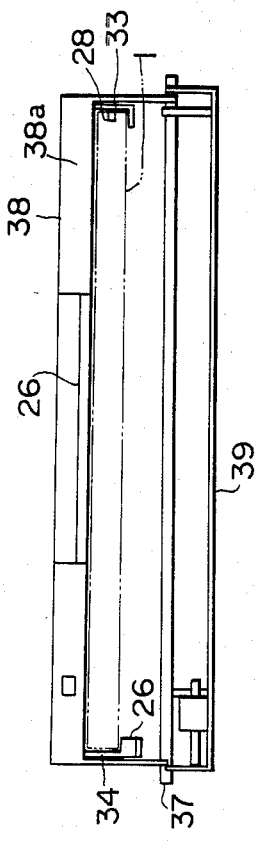

Supposing now that the jacket 1 in the state of FIGS. 5, 6 (A) and 6 (B) is inserted into the cartridge holder 26, the two opposite side portions 1a and 1b of the jacket 1 are displaced toward the hinge shaft 37 while being regulated by the support regions 33 and 34 located in the cartridge holder 26.

And when the jacket 1 thus inserted reaches a predetermined position in the cartridge holder 26, the boss or guide element 28 formed on one of the support regions 33 comes to be fitted into the guide groove 25 in the one longitudinal section of the peripheral wall 24 of the jacket 1. With further insertion of the jacket 1 in the holder 26, the projection 23 on the shutter member 19 butts to the boss 28 and is thereby depressed against the elasticity of the elastic member 29 in the direction (rightward in FIG. 1) opposite to the insertion of the jacket 1 into the holder 26 due to the presence of the boss 28. Consequently, the slide plate 20 having the protrusion 23 is shifted in a rightward direction in FIG. 1 along the channel 22, and it follows naturally that the shutter member 19 attached to the slide plate 20 is also shifted in the same direction. Therefore, the shutter member 19 that has been completely closing the window 3 is moved therefrom. In the subsequent stage where the jacket 1 is advanced in the holder 26 until the front edge or front side section 1c of the jacket 1 comes into contact with the inner surface 35a of the joint plate 35 constituting the holder 26, the shutter member 19 is completely moved from the window 3 by the action of the boss 28 and therefore the surface of the magnetic sheet 2 corresponding in area to the opening of the window 3 is exposed to the outside. With the jacket 1 inserted up to this position in the holder 26, when the case cover 38 is rotated slightly toward the base plate 39 around the hinge shaft 37 against the cartridge holder 26, the leftward or rightward displacement of the jacket 1 in FIG. 7 (A) is prohibited between the front plate 38a of the case cover 38 and the joint plate 35 of the cartridge holder 26, so that the jacket body 1 comes to be held in the cartridge holder 26. And due to the provision of a positioning mechanism 48 on the joint plate 35, the jacket 1 can be retained at a proper position in the cartridge holder 26. As a result, the upper guide plate 47 of the case cover 38 is set opposite to the position of the window 3 in the jacket 1.

Figure 7A:
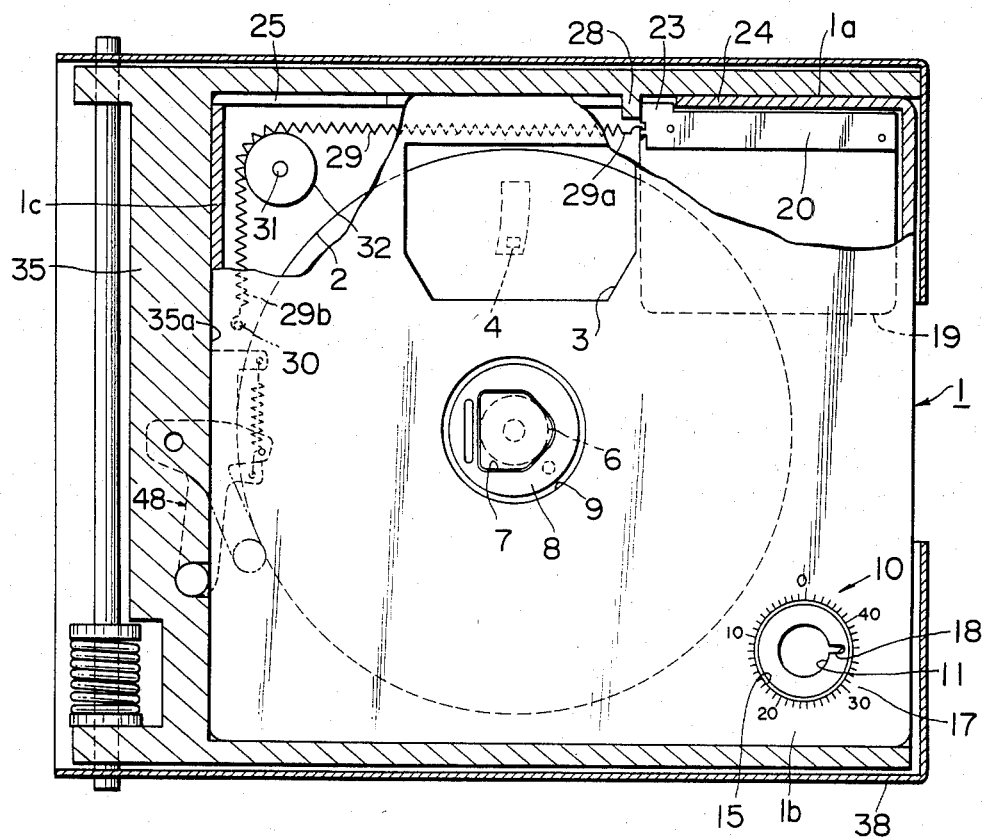
FIGS. 7(A) and (B) are plan and side sectional views of the cartridge holder of FIG. 5 in which the cartridge of FIG. 1 is inserted.
Figure 7B:
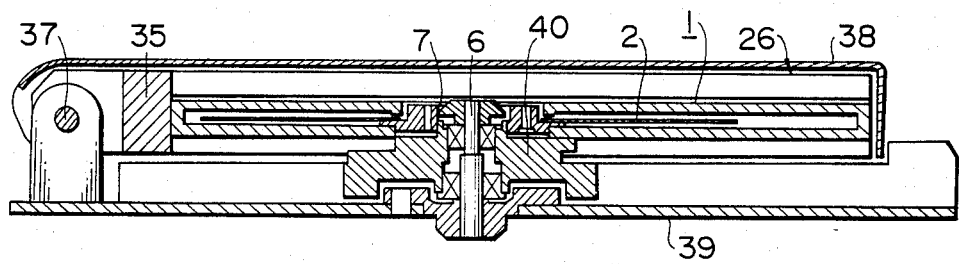

When the case cover 38 is pressed toward the base plate 39, the driver spindle 6 on the base plate 39 is inserted into the drive hole 7 in the jacket 1 as illustrated in FIG. 7 (B), while the upper guide plate 47 is brought into direct engagement with a plurality of positioning pins 49 infixed on the lower guide plate 45. Accordingly, the upper guide plate 47 is supported with accuracy at a predetermined proper position spaced apart from the lower guide plate 45 which serves as a positional reference. And the magnetic head 4 inserted through the window 3 is brought into contact with the magnetic sheet 2. Therefore, with rotation of the drive spindle 6 by the motor 43, desired video signals are magnetically recorded in the form of annular tracks on the magnetic sheet 2 by the head 4.

In the foregoing embodiment where the boss 28 is provided merely on one of the support regions 33 and 34 in the cartridge holder 26 and is insertable into the elongate hole or guide groove 25 formed in the jacket 1, wrong insertion of the jacket 1 into the holder 26 is prohibited by the boss 28 in case the loading direction is such that the other side portion 1b of the jacket 1 without the presence of such elongate hole 25 is positioned in one support region 33 of the cartridge holder 26. Thus, the boss 28 is utilizable as means for preventing erroneous insertion of the jacket 1, hence achieving its proper loading in the holder 26.

When the jacket 1 is extracted after releasing the case cover 38 and the cartridge holder 26 from the base plate 39, the boss 28 on the jacket holder 26 is separated from the protrusion 23 of the jacket 1, so that the slide plate 20 is moved in a leftward direction from the state of FIG. 7 (A) by the elasticity of the elastic member 29. Consequently, the shutter member 19 is also slid therewith in the same direction to cover the window 3. It follows that the window 3 is automatically closed with the shutter member 19 upon complete extraction of the jacket 1 from the cartridge holder 26.

According to the present invention, as described hereinabove, the shutter member which is movable across the window is automatically removed therefrom with insertion of the jacket into the cartridge holder and is moved in the opposite direction to automatically close the window with extraction of the jacket from the cartridge holder. Thus, it becomes possible to attain remarkable handling facility as compared with the conventional manual type sheet jacket while achieving another advantage of preventing entrance of dust and so forth through the window.

While the present invention has been particularly shown and described with reference to a preferred embodiment, it should be readily appreciated by those of ordinary skill in the art that various changes and modifications in form and details may be made without departing from the spirit and scope of the invention. Some of these modifications have been described above and others will be obvious to the reader. It is intended that the appended claims be interpreted as including the foregoing as well as other changes and modifications within the spirit and scope of the invention as defined by the appended claims.

What is claimed is:

1. In a magnetic disc cartridge having a jacket and a rotatable magnetic disc housed within said jacket for recording signals thereon and reproducing signals therefrom when said cartridge, carried between opposing guide rails of a cartridge holder, is inserted into recording or reproducing apparatus, the combination of: a guide groove in one wall of said jacket extending in the direction in which said cartridge is slid between said guide rails of said cartridge holder for receiving a guide element on one of said guide rails to establish a predetermined orientation of said cartridge relative to said cartridge holder when said cartridge is properly oriented relative to said guide rails, wherein said guide groove is open along a length thereof for permitting said guide element to extend transversely into said guide groove during sliding of said cartridge between said guide rails; a window in said jacket for providing access to said magnetic disc to record signals thereon and reproduce signals therefrom; shutter means movable relative to said window between a closed position covering said window and an open position exposing said magnetic disc; and engagement means on said shutter means disposed relative to said guide groove for contact by said guide element as said cartridge is slid into said cartridge holder to move said shutter means from said closed position to said open position.

2. The magnetic disc cartridge of claim 1, wherein only a single said guide groove is provided on said cartridge.

3. The magnetic disc cartridge of claim 1 in combination with a cartridge holder for removably holding said cartridge for insertion into recording or reproducing apparatus, said cartridge holder comprising a pair of oppositely spaced guide rails for slidably receiving longitudinal edges of said jacket and guiding said magnetic disc cartridge into said cartridge holder, wherein said guide element is disposed on one of said guide rails for blocking entry of said magnetic disc cartridge into said guide rails when said cartridge is improperly positioned relative thereto and for entering said guide groove and engaging said engagement means on said shutter means to move said shutter means from said closed position to said open position as said cartridge is slid into said cartridge holder.

4. The combination of claim 3, wherein said jacket includes substantially parallel first and second walls and a peripheral wall substantially perpendicular to said first and second walls and circumscribing said jacket, wherein said peripheral wall has opposite longitudinal sections received by said guide rails, said shutter means includes a lid member mounted on said jacket for sliding movement in the direction of said guide groove and said engagement means includes a projection disposed on said lid member for contacting said guide element on said cartridge holder to slide said lid member into said open position as said cartridge slides into said cartridge holder.

5. The combination of claim 4, wherein said guide groove is disposed in one of said longitudinal sections of said peripheral wall of said jacket.

6. The combination of claim 5, wherein said guide groove commences at the beginning of said one longitudinal section of said peripheral wall and extends less than the length of said one longitudinal section.

7. The combination of claim 3, wherein said jacket includes substantially parallel first and second walls and a peripheral wall substantially perpendicular to said first and second walls and circumscribing said jacket, said first and second walls are substantially rectangular so that front, rear and opposite side sections of said peripheral wall are defined along margins of said rectangular walls, and said guide groove is disposed in one of said side sections and extends from said front section toward said rear section less than the length of said one side section, whereby in said predetermined orientation of said cartridge relative to said cartridge holder said front section of said cartridge is inserted first between said guide rails with said one side section aligned with said one guide rail having said guide element thereon.

8. The combination of claim 7, wherein said guide rails comprise a pair of L-shaped members for receiving the respective side sections of said peripheral wall of said jacket.

9. The combination of claim 8, wherein said guide element comprises a boss projecting from one of said L-shaped members.

10. The magnetic disc cartridge of claim 1, wherein said shutter means comprises a lid member mounted in respect to said jacket for sliding movement in the direction of said guide groove and said engagement means is disposed on said lid member for contacting said guide element on said cartridge holder to slide said lid member into said open position as said cartridge slides into said cartridge holder.

11. The magnetic disc cartridge of claim 10, wherein said jacket includes substantially parallel first and second walls and a peripheral wall substantially perpendicular to said first and second walls and circumscribing said jacket, and said guide groove is provided in said peripheral wall and extends substantially parallel to said first and second walls.

12. The magnetic disc cartridge of claim 11, wherein said lid member includes pins slidably mounted in channels in said first and second walls of said jacket and said cartridge further comprises spring means cooperating with said jacket and said lid member for biasing said lid member into said closed position.

13. The magnetic disc cartridge of claim 12, wherein
said first and second walls substantially have the configuration of a rectangle and said guide groove extends from one corner of said rectangle;
said jacket has aligned windows in both said first and second walls;
said lid member straddles said disc for exposing said disc through both said windows when in said open position and covering both said windows in said closed position;
said channels at the ends thereof comprise stop means for cooperating with said pins on said lid member to limit the movement of said lid member in said closed position against the force of said spring; and
said spring means comprises a tension spring secured at one end to said lid member and at the other end to said jacket.

14. The magnetic disc cartridge of claim 13, wherein said tension spring extends around a pulley mounted in said jacket between said first and second walls.

* * * * *